(12) United States Patent
Allstead, Jr. et al.

(10) Patent No.: US 10,798,442 B2
(45) Date of Patent: Oct. 6, 2020

(54) COORDINATION OF CONNECTED HOME DEVICES TO PROVIDE IMMERSIVE ENTERTAINMENT EXPERIENCES

(71) Applicant: The DIRECTV Group, Inc., El Segundo, CA (US)

(72) Inventors: Steven Allstead, Jr., Long Beach, CA (US); Cory Bernhardt, Lomita, CA (US); Michael Habif, Long Beach, CA (US); Megha Venugopal, Union City, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/433,301

(22) Filed: Feb. 15, 2017

(65) Prior Publication Data

US 2018/0234726 A1 Aug. 16, 2018

(51) Int. Cl.
*H04N 21/845* (2011.01)
*H04N 21/462* (2011.01)
(Continued)

(52) U.S. Cl.
CPC ..... *H04N 21/43615* (2013.01); *H04L 12/281* (2013.01); *H04L 65/4076* (2013.01); *H04L 65/4084* (2013.01); *H04N 21/2665* (2013.01); *H04N 21/4131* (2013.01); *H04N 21/41407* (2013.01); *H04N 21/4302* (2013.01); *H04N 21/4307* (2013.01); *H04N 21/4622* (2013.01);
(Continued)

(58) Field of Classification Search
CPC ........... H04N 21/43615; H04N 21/242; H04N 21/4302; H04N 21/6125; H04N 21/6379; H04N 21/845; H04L 12/281; H04L 2012/2841; H04L 2012/2849
USPC ........................................................ 725/80
See application file for complete search history.

(56) References Cited

U.S. PATENT DOCUMENTS 6,698,020 B1 2/2004 Zigmond et al.
8,078,290 B2 12/2011 Nelson
(Continued)

FOREIGN PATENT DOCUMENTS

CN 104950853 A 9/2015
EP 2891337 B2 12/2016
(Continued)

OTHER PUBLICATIONS

Heemin Park et al., "Intelligent Lighting Control using Wireless Sensor Networks for Media Production." TIIS 3.5 (Oct. 30, 2009): pp. 423-443. http://remap.ucla.edu/jburke/publications/Park-et-al-2009_Intelligent-lightingcontrol.pdf.
(Continued)

*Primary Examiner* — Nathan J Flynn
*Assistant Examiner* — Caroline Somera

(57) ABSTRACT

In one example, the present disclosure describes a device, computer-readable medium, and method for providing immersive entertainment experiences by coordinating the actions of connected home devices. For instance, in one example, a metadata file is encoded in a first signal. The metadata file contains data that indicates how to adjust a setting of a connected home device to synchronize a home system with a portion of a media. The first signal is then delivered to a customer device in communication with the connected home device.

20 Claims, 3 Drawing Sheets

(51) Int. Cl.
    *H04N 21/2665*    (2011.01)
    *H04N 21/8547*    (2011.01)
    *H04N 21/436*     (2011.01)
    *H04L 12/28*      (2006.01)
    *H04N 21/43*      (2011.01)
    *H04L 29/06*      (2006.01)
    *H04N 21/84*      (2011.01)
    *H04N 21/414*     (2011.01)
    *H04N 21/41*      (2011.01)

(52) U.S. Cl.
    CPC .......... *H04N 21/84* (2013.01); *H04N 21/845* (2013.01); *H04N 21/8547* (2013.01); *H04L 2012/2841* (2013.01); *H04L 2012/2849* (2013.01)

(56) References Cited

U.S. PATENT DOCUMENTS

| | | | |
|---|---|---|---|
| 8,928,812 B2* | 1/2015 | Li | G05B 15/02 340/12.22 |
| 9,233,301 B2 | 1/2016 | Igoe | |
| 9,310,982 B1* | 4/2016 | McClintock | G06Q 50/00 |
| 9,423,779 B2 | 8/2016 | Agarwal | |
| 9,473,813 B2 | 10/2016 | Gupta et al. | |
| 9,480,131 B1 | 10/2016 | Thorn | |
| 9,483,934 B2 | 11/2016 | Kotlicki | |
| 9,521,375 B2 | 12/2016 | Beaumier et al. | |
| 2004/0019608 A1* | 1/2004 | Obrador | G06F 17/30044 |
| 2006/0062424 A1* | 3/2006 | Diederiks | H04N 21/4131 382/100 |
| 2010/0262336 A1* | 10/2010 | Rivas | B60H 1/00735 701/36 |
| 2010/0275235 A1* | 10/2010 | Joo | H04N 5/262 725/74 |
| 2013/0007809 A1* | 1/2013 | Hays | H04N 21/4131 725/47 |
| 2013/0181901 A1 | 7/2013 | West | |
| 2013/0198786 A1* | 8/2013 | Cook | H05B 37/0272 725/81 |
| 2013/0245796 A1* | 9/2013 | Lentzitzky | H04L 65/60 700/90 |
| 2014/0046462 A1 | 2/2014 | Mets | |
| 2014/0273818 A1* | 9/2014 | Sallas | H04W 8/005 455/41.1 |
| 2015/0111547 A1* | 4/2015 | Baldini | H04W 4/18 455/414.4 |
| 2016/0165196 A1 | 6/2016 | Gocke | |
| 2016/0195856 A1 | 7/2016 | Spero | |
| 2016/0277203 A1 | 9/2016 | Jin et al. | |
| 2017/0006334 A1* | 1/2017 | Beckett | H04N 21/43615 |
| 2017/0034894 A1 | 2/2017 | Thorn | |
| 2017/0064414 A1* | 3/2017 | Mickelsen | H04N 21/4131 |

FOREIGN PATENT DOCUMENTS

| | | |
|---|---|---|
| JP | 5932819 | 6/2016 |
| WO | 2015148693 A1 | 10/2015 |

OTHER PUBLICATIONS

"Wi-Fi Certified TimeSync™ brings precise synchronization to Wi-Fi® devices," Marketwired Wired, marketwired.com, Jan. 5, 2017. 2 Pages. http://www.marketwired.com/press-release/wi-fi-certified-timesync-brings-precisesynchronization-to-wi-fir-devices-2186404.htm.

Luke Mulunda, "Samsung lets the Smart experience begin," Business Today, businesstoday.co.ke, Jul. 11, 2012. 18 Pages. http://businesstoday.co.ke/samsung-lets-the-smart-experience-begin/.

"Evolution Digital Launches eGUIDE, Powered by Rovi's Fan TV Platform, on New eBOX IP Hybrid," Press Releases, Evolution Digital, evolutiondigital.com, May 12, 2016. 7 Pages. https://evolutiondigital.com/evolution-digital-launches-eguide-powered-by-rovisfan-tv-platform-on-new-ebox-ip-hybrid/.

\* cited by examiner

COORDINATION OF CONNECTED HOME DEVICES TO PROVIDE IMMERSIVE ENTERTAINMENT EXPERIENCES

The present disclosure relates generally to home automation, and relates more particularly to devices, non-transitory computer-readable media, and methods for coordinating connected home devices to provide immersive entertainment experiences.

BACKGROUND

Home automation includes the control and automation of home systems such as lighting, heating/air conditioning, security, and other systems. For instance, "smart" devices such as thermostats, home appliances, and other devices may be programmed monitor the related home systems and to react to certain detected conditions by adjusting the settings of the related home systems. These smart devices may also be capable of communicating with each other, with a centralized hub or controller, and/or with user communication devices, e.g., using wired and/or wireless communication protocols. In this way, the smart devices may also adjust the settings of the related home systems based on signals received via the hub/controller or the user communication devices.

For instance, a smart thermostat may be programmed to automatically adjust the settings of a home heating system to maintain a predefined temperature in the home during a specific window of time. The smart thermostat could also adjust the settings of the home heating system in response to a user command. The user command may be received directly from a user communication device (e.g., a smartphone, a tablet computer, or the like) or relayed from the user communication device via the hub/controller.

SUMMARY

In one example, the present disclosure describes a device, computer-readable medium, and method for providing immersive entertainment experiences by coordinating the actions of connected home devices. For instance, in one example, a metadata file is encoded in a first signal. The metadata file contains data that indicates how to adjust a setting of a connected home device to synchronize a home system with a portion of a media. The first signal is then delivered to a customer device in communication with the connected home device.

In another example, a metadata file is extracted from a first signal. An instruction is then sent to a connected home device based on contents of the metadata file. The instruction instructs the connected home device to adjust a setting to synchronize a home system with a portion of the media.

In another example, a device includes a processor and a computer-readable medium storing instructions which, when executed by the processor, cause the processor to perform operations. The operations include extracting a metadata file from a first signal and sending an instruction to a connected home device based on contents of the metadata file, wherein the instruction instructs the connected home device to adjust a setting to synchronize a home system with a portion of the media.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides immersive entertainment experiences by coordinating the actions of connected home devices. As discussed above, "smart" devices such as thermostats, home appliances, and other devices may be programmed monitor the related home systems and to react to certain detected conditions by adjusting the settings of the related home systems. As such, these smart devices may also be referred to as "connected home devices." For instance, a smart thermostat may be programmed to automatically adjust the settings of a home heating system to maintain a predefined temperature in the home during a specific window of time, or in response to a user command.

Examples of the present disclosure leverage the availability of connected home devices in a home to provide a more immersive experience for customers experiencing a media (e.g., an audio/video media such as a television program or movie, an audio media such as music, or a video media such as an image slideshow) in the home. For instance, a data signal or metadata file associated with the media may be provided to a hub or controller in the home. In one example, a set top box may act as the controller. In another example, a smart phone or other user communication device may act as the controller. Based on the data in the metadata file, the controller may send instructions to the connected home devices to take actions that synchronize certain home systems to the media. For example, if the media is a television program, and the current scene of the television program takes place in a desert, then the controller may (based on the data in the metadata file) instruct a smart thermostat to temporarily raise the temperature in the room in which the television program is being viewed and/or instruct a smart dimming switch to brighten the lighting in the room. Alternatively, if the current scene takes place in a blizzard, the controller may instruct the smart thermostat to lower the temperature and/or instruct the smart dimming switch to dim the lighting. If the current scene depicts explosions or lasers, the controller may instruct the smart dimming switch to flash the lights. Thus, the connected home systems may be manipulated to make the viewer feel as if he is "in" the current scene. This allows the viewer to experience the media in a more immersive fashion.

Figure 1:
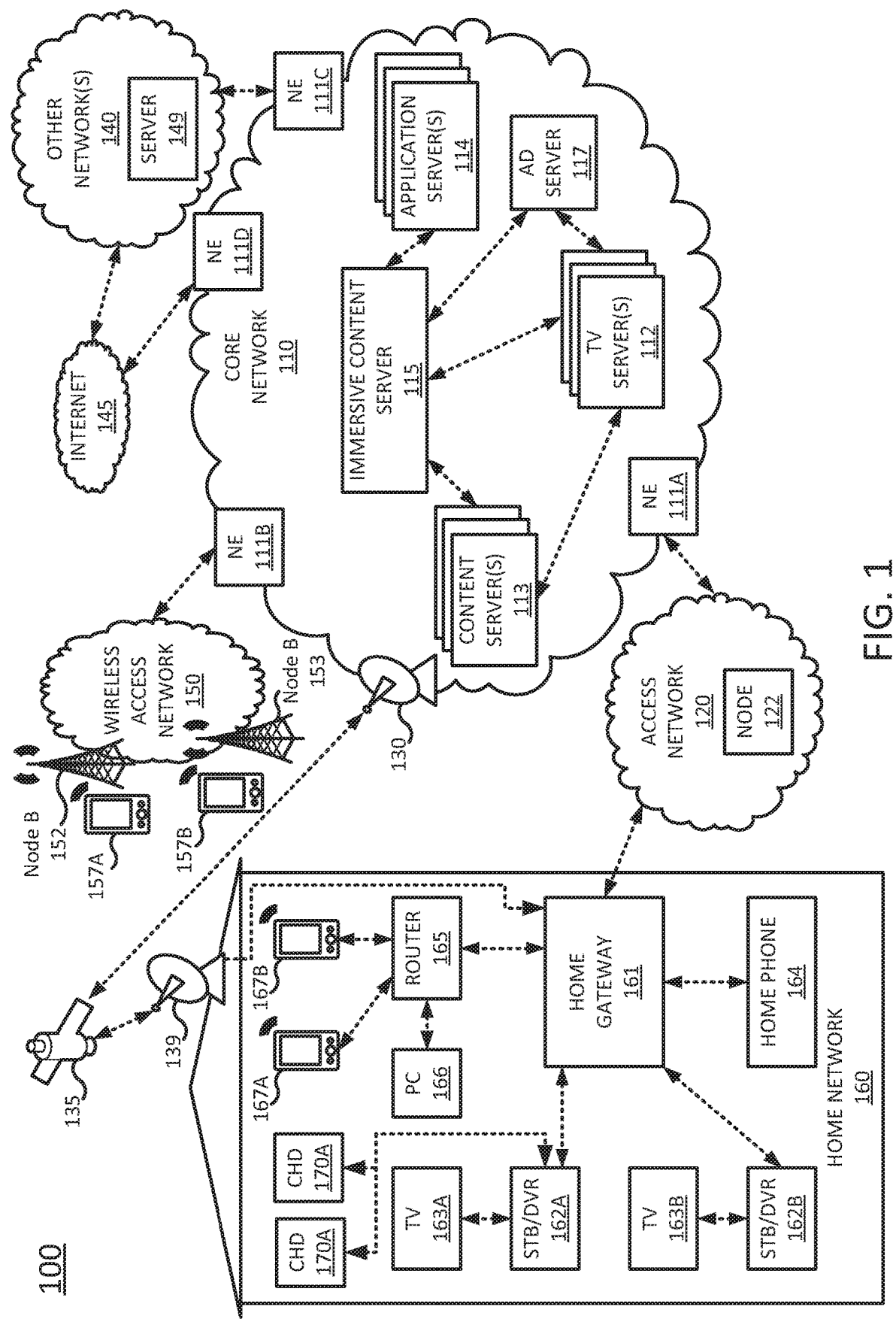
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an immersive content server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and immersive content server 115 to select which video programs, or other content and advertisements to provide to the home network 160 and to others.

In one example, content servers 113 may store scheduled television broadcast content for a number of television channels, video-on-demand programming, local programming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, immersive content server 115 may generate and/or store metadata files associated with media stored by content servers 113 and/or advertising server 117. The immersive content server 115 may also store metadata files associated with other media not stored by the content servers 113 or advertising server 117. The metadata files contain data or instructions (e.g., tags) that indicate when and/or how the settings of connected home devices may be adjusted to make a customer's experience of the media more immersive, as discussed in greater detail below. In one example, the immersive content server 115 further stores an index that indicates the media with which a particular metadata file is associated. In one example, a given metadata file may be human-generated (e.g., a person reviews the media and indicates each time period during which a particular action should be taken by a connected home device). In another example, a given metadata file may be automatically generated (e.g., by a computing device or algorithm that analyzes the media using image recognition, character recognition, or other techniques).

Figure 4:
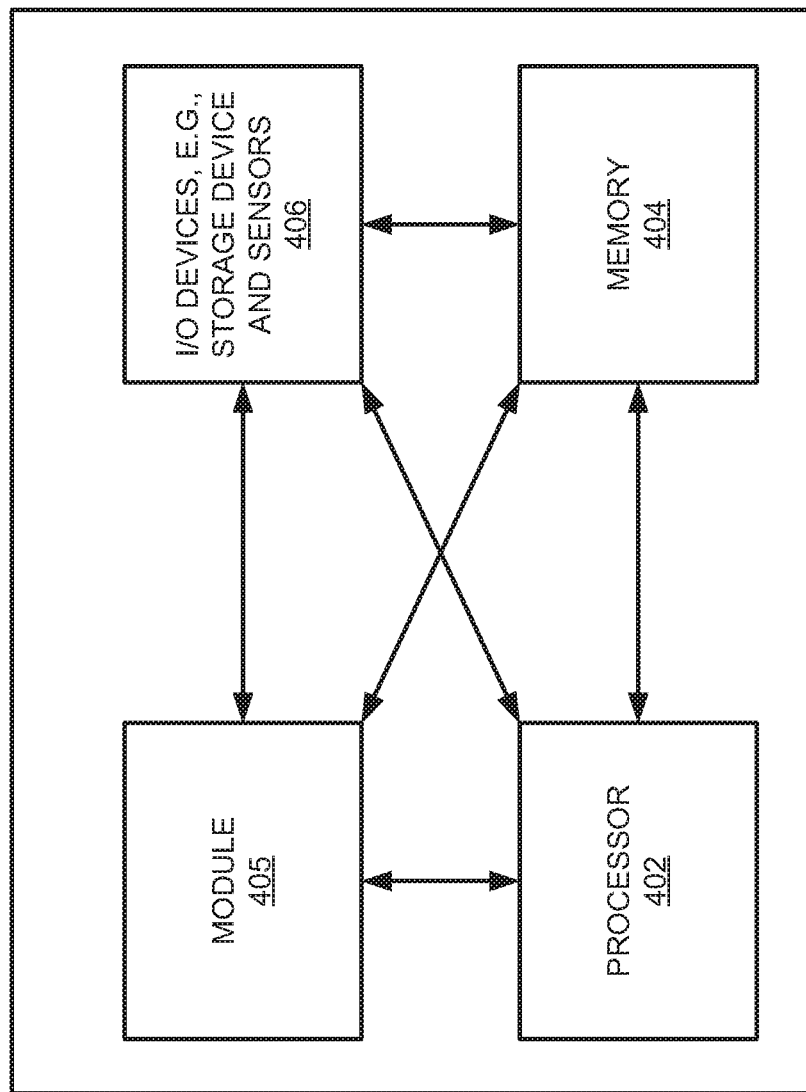
FIG. 4 depicts a high-level block diagram of a computing device specifically programmed to perform the functions described herein.

In one example, any or all of the television servers 112, content servers 113, application servers 114, immersive content server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 and/or metadata files from immersive content server 115 for uplink transmission to satellite 135. Accordingly, satellite 135 may receive television content and/or metadata files from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data and metadata files are forwarded to set-top boxes (STBs)/digital video recorders (DVRs) 162A and 162B to be decoded, recorded, and/or forwarded to television (TV) 163A and TV 163B for presentation or to connected home devices (CHDs) 170A and 170B for further action. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, one or both of the STB/DVR 162A and STB/DVR 162B may comprise a computing system or server, such as computing system 400 depicted in FIG. 4, which coordinates the actions of the CHDs 170A and 170B, as described herein. One or both of the STB/DVR 162A and STB/DVR 162B is further configured to decode data streams and to forward decoded data to a paired TV 163A or 163B for display.

In one example, the CHDs 170A and 170B comprise "smart" devices that are configured to monitor various conditions in the home (e.g., temperature, brightness, etc.) and to react to certain detected conditions by adjusting the settings of the home systems that control these conditions (e.g., heating, air conditioning, lighting, security, etc.). The CHDs 170A and 170B may also be configured to adjust the settings of the home systems based on signals received from a centralized controller, such as one of the STB/DVRs 162A and 162B. For instance, the CHDs 170A and 170B may include a smart thermostat, a smart dimmer switch, and/or another type of connected home device.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
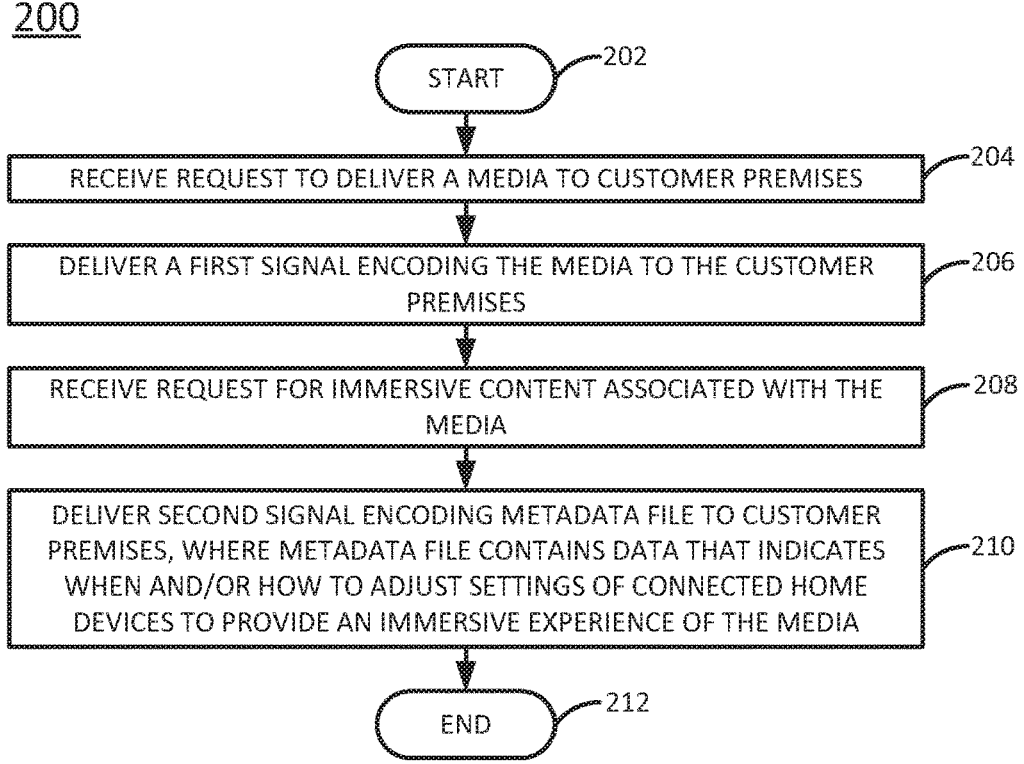
FIG. 2 illustrates a flowchart of a first example method for providing immersive entertainment experiences in accordance with the present disclosure.

To further aid in understanding the present disclosure, FIG. 2 illustrates a flowchart of a first example method 200 for providing immersive entertainment experiences in accordance with the present disclosure. In one example, the method 200 may be performed by a television server that is configured for the delivery of television content, such as the television servers 112 illustrated in FIG. 1. However, in other examples, the method 200 may be performed by another device. As such, any references in the discussion of the method 200 to the television servers 112 of FIG. 1 are not intended to limit the means by which the method 200 may be performed.

The method 200 begins in step 202. In step 204, the television server 112 receives a request to deliver a media to a customer premises. The request may come, for example, via a signal forwarded by one of the STB/DVRs 162A or 162B and delivered via uplink satellite transmission, via pack transmission over access network 120, or via another communication channel. The media that is requested may comprise an audio/video media (e.g., a television program or a movie), an audio-only media (e.g., a song, an audio book, or a podcast), or a video-only media (e.g., an image slideshow). The media may reside on one or more of the television servers 112, content servers 113, or advertising serves 117.

In step 206, the television server 112 delivers a first signal encoding the media to the customer premises. The first signal may be delivered, for example, to one of the STB/DVRs 162A or 162B for decoding and/or play on a paired television 163A or 163B. In another example, the first signal may be delivered to a mobile communication device located at the customer premises (e.g., mobile device 167A or 167B), such as a smartphone, a tablet computer, or a wearable computing device (e.g., a smart watch). In another example, the first signal may be delivered to another device that is capable of decoding and/or playing the first signal, such as a personal computer (e.g., PC 166), a smart television, or a smart or satellite radio.

In step 208, the television server 112 receives a request for immersive content associated with the media. In one example, the request may be received in response to a query from the television server 112. For instance, the television server may detect, upon retrieving the media, that immersive content is available for the media and may ask if the customer wishes to experience the media in an immersive fashion. In another example, a customer may explicitly select a version of the media that includes immersive content from a listing or menu displayed on a device at the customer premises. In one example, the request is received in the form of an audible (e.g., voice-activated) command from the user.

In step 210, the television server 112 delivers a second signal encoding a metadata file to the customer premises. The metadata file may contain data or instructions (e.g., tags) that indicate when and/or how the settings of connected home devices such as CHDs 170A and 170B may be adjusted to make the customer's experience of the media more immersive by synchronizing a home system with a portion of the media (e.g., dim the lights during a first defined window of time, raise the temperature during a second defined window of time, etc.). For instance, the metadata file may tag a sequence of frames of the media, or a sequence of timecodes associated with the media, with tags or descriptors that indicate actions that may be taken by connected home devices (e.g., lower temperature, dim lights, etc.) or desired values of the associated home systems (e.g., sixty degrees Celsius, fifty percent brightness, etc.) during play of the tagged frames or timecodes.

In one example, the metadata file is stored in the immersive content server 115 and is associated with the media in some way (e.g., in an index). In one example, the second signal is delivered to the same device to which the first signal was delivered in step 206. For instance, one or both of STB/DVRs 162A and 162B may be configured to both decode media and to control CHDs 170A and 170B. In another example, the first signal and the second signal are sent to different devices that are synchronized with each other to present the media and immersive content.

The method 200 ends in step 212.

Figure 3:
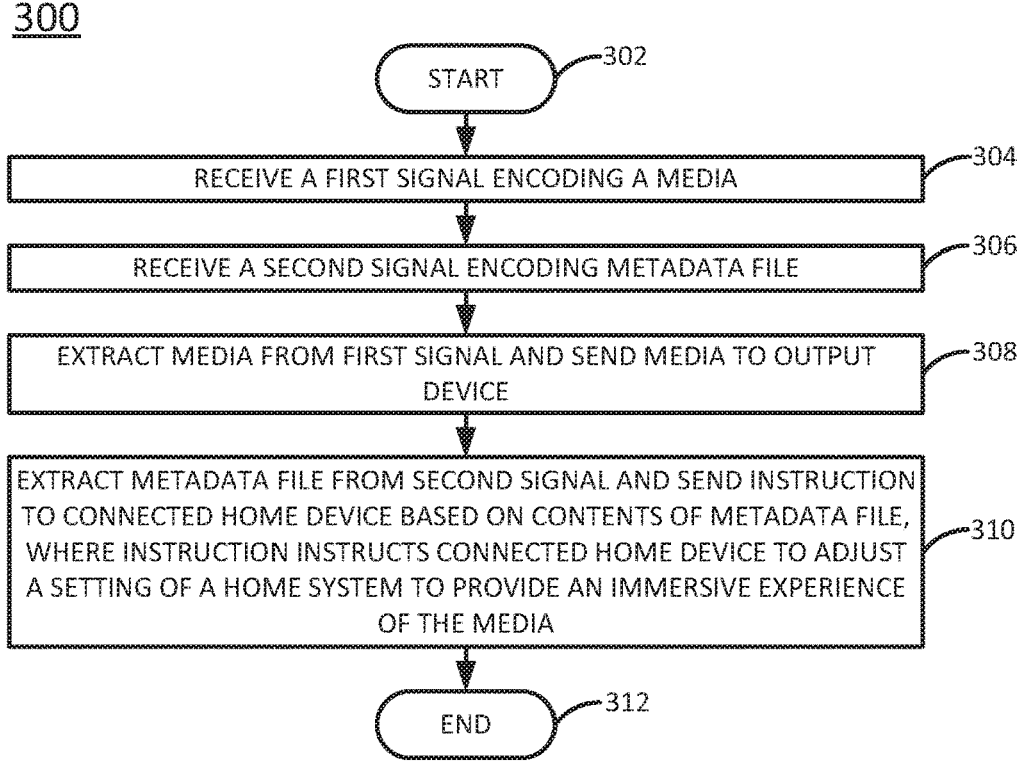
FIG. 3 illustrates a flowchart of a second example method for providing immersive entertainment experiences in accordance with the present disclosure.

FIG. 3 illustrates a flowchart of a second example method 300 for providing immersive entertainment experiences in accordance with the present disclosure. In one example, the method 300 may be performed by a "controller," which may be a device that is configured for the decoding of television content from a signal and for the control of connected home devices, such as the STB/DVRs 162A and 162B or the mobile devices 167A and 167B illustrated in FIG. 1. However, in other examples, the controller may be another device. For instance, signals encoding the media and the metadata files for providing an immersive experience of the media may be received by different devices. As such, any references in the discussion of the method 300 to the STB/DVRs 162A and 162B or the mobile devices 167A and 167B of FIG. 1 are not intended to limit the means by which the method 300 may be performed.

The method 300 begins in step 302. In step 304, the controller receives a first signal encoding a media. The media may be an audio/video media (e.g., a television program or a movie), an audio-only media (e.g., a song, an audio book, or a podcast), a video-only media (e.g., an image slideshow), or another kind of media that can be played by the controller or by a device communicatively coupled to the controller (e.g., a television set, a speaker, or the like). The first signal may be sent, for example, by one of the television servers 112 of FIG. 1. The first signal may be sent in response to a request from the controller for access to the media.

In step 306, the controller receives a second signal encoding a metadata file. The metadata file may contain data or instructions (e.g., tags) that indicate when and/or how the settings of connected home devices such as CHDs 170A and 170B may be adjusted to make the customer's experience of the media more immersive (e.g., dim the lights during a first defined window of time, raise the temperature during a second defined window of time, etc.). For instance, the metadata file may tag a sequence of frames of the media, or a sequence of timecodes associated with the media, with tags or descriptors that indicate actions that may be taken by connected home devices (e.g., lower temperature, dim lights, etc.) during play of the tagged frames or timecodes. The second signal may be sent, for example, by one of the television servers 112 of FIG. 1.

The second signal may be sent in response to a request from the controller for access to the media. For instance, the controller may respond to a query from the television server 112 asking whether the customer wishes to experience the media in an immersive fashion. In another example, the controller may explicitly request a version of the media that includes immersive content, e.g., by selecting the version from a listing or menu.

In step 308, the controller extracts the media from the first signal and sends the media to an output device for play (e.g., a display device such as TVs 163A or 163B, a speaker or audio output, etc.).

In step 310, the controller extracts the metadata file from the second signal and sends an instruction to at least one connected home device (e.g., CHD 170A or 170B) based on the contents of the metadata file. The instruction instructs the connected home device to take a particular action (e.g., adjust a setting) with respect to an associated home system at a particular time. For instance, the instruction may instruct a smart thermostat to lower the temperature at the particular time, or may instruct a smart dimming switch the dim the lights at the particular time. In one example, the instruction is sent before the action is to be taken, so that the connected home device has enough time to produce the desired effect at the desired time (e.g., a large change in temperature may not be possible to produce instantaneously). For instance, the instruction may be sent to the connected home device when the output device begins playing the media (e.g., "set temperature to sixty degrees Celsius at 9:17 PM and maintain for three minutes."). In this case, the instruction may need to be updated if play of the media is paused. In another example, the instruction may be sent a predefined period of time before the desired action is to be taken (e.g., "in one minute, set temperature to sixty degrees Celsius and maintain for three minutes"). In one example, the controller monitors the progress of the media in conjunction with the metadata file in order to determine when to send the instructions to the connected home devices.

The method 300 ends in step 312.

Although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, a server (such as might be used to perform the method 200) or a set top box or other controller (such as might be used to perform the method 300) could be implemented as illustrated in FIG. 4.

As depicted in FIG. 4, the system 400 comprises a hardware processor element 402, a memory 404, a module 405 for providing an immersive media experience, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing an immersive media experience may include circuitry and/or logic for performing special purpose functions relating to the operation of a set top box or other media controller. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing an immersive media experience (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing an immersive media experience (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

Examples of the present disclosure may be implemented in manners other than what is described above. For instance, the above examples describe only examples in which the media is delivered in a streaming or similar fashion (e.g., broadcast) from a remote server. In another example, the media could be played from a local file (e.g., stored on the customer's computer) or from a tangible media, such as a compact disk (CD) or a digital video disk (DVD). In this case, the controller may recognize the media (e.g., upon launch of the media by an output device) and query a remote server (e.g., content servers 113, immersive content server 115, or other servers) for a metadata file corresponding to the media. The metadata file could then be delivered to the controller as a standalone file. This would allow examples of the present disclosure to be backwards compatible with media that is not delivered in a streaming or similar fashion.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
encoding a metadata file in a first signal, wherein the metadata file contains data that indicates how to adjust a setting of a connected home device to synchronize the connected home device with a portion of a media presented via an output device, wherein the metadata file is generated using image recognition or character recognition applied to the portion of the media;
encoding the media in a second signal;
receiving, from a customer device of a customer, a request to deliver the media to the customer device;
detecting, in response to the receiving the request, that the metadata file is associated with the media;

querying the customer device to determine whether the customer wishes to receive the metadata file;

receiving, from the customer device, a response indicating that the customer wishes to receive the metadata file;

delivering the first signal to the customer device in communication with the connected home device, wherein the customer device is a mobile communications device that is synchronized with the output device, wherein the data causes the mobile communication device to adjust the setting of the connected home device in coordination with the portion of the media, when the portion of the media is presented via the output device, and wherein the mobile communication device comprises a smartphone or a wearable computing device; and delivering the second signal to the customer device for presentation of the media via the output device.

2. The method of claim 1, wherein the detecting comprises:

detecting that the metadata file is associated with the media in an index.

3. The method of claim 1, wherein the metadata file comprises a tag that associates a value for the setting with a sequence of frames of the media.

4. The method of claim 1, wherein the metadata file comprises a tag that associates a value for the setting with a sequence of timecodes of the media.

5. A method, comprising:

sending, by a customer device of a customer, a request for delivery of a media to the customer device, wherein the customer device comprises a mobile communication device, wherein the mobile communication device comprises a smartphone or a wearable computing device;

receiving, by the customer device, in response to the sending the request, a query to determine whether the customer wishes to receive a metadata file associated with the media, wherein the metadata file is generated using image recognition or character recognition applied to the media;

sending, by the customer device, a response indicating that the customer wishes to receive the metadata file;

receiving, by the customer device, the metadata file from a first signal;

extracting, by the customer device, the metadata file from the first signal, wherein the metadata file is associated with the media for presentation via an output device, wherein the customer device is synchronized with the output device;

receiving, by the customer device, the media from a second signal; and sending, by the customer device, an instruction to a connected home device based on contents of the metadata file, wherein the instruction instructs the connected home device to adjust a setting to synchronize the connected home device with a portion of the media that is being presented via the output device.

6. The method of claim 5, further comprising:
extracting the media from the second signal; and
delivering the media to the output device.

7. The method of claim 5, wherein the metadata file comprises a tag that associates a value for the setting with a sequence of frames of the media.

8. The method of claim 5, wherein the metadata file comprises a tag that associates a value for the setting with a sequence of timecodes of the media.

9. The method of claim 5, wherein the instruction is sent to the connected home device before the setting is to be adjusted.

10. The method of claim 5, further comprising:
recognizing the media upon launch of the media by the output device; and
wherein the metadata file is received from a remote server.

11. The method of claim 10, wherein the media is stored on a tangible medium.

12. The method of claim 10, wherein the media is stored locally on the customer device.

13. A device, comprising:
a processor; and
a computer-readable medium storing instructions which, when executed by the processor, cause the processor to perform operations, the operations comprising:

sending a request for delivery of a media to the device, wherein the device comprises a mobile communication device, wherein the mobile communication device comprises a smartphone or a wearable computing device;

receiving, in response to the sending the request, a query to determine whether a customer associated with the device wishes to receive a metadata file associated with the media, wherein the metadata file is generated using image recognition or character recognition applied to the media;

sending a response indicating that the customer wishes to receive the metadata file;

receiving the metadata file from a first signal;

extracting the metadata file from the first signal, wherein the metadata file is associated with the media for presentation via an output device, wherein the device is synchronized with the output device;

receiving the media from a second signal; and sending an instruction to a connected home device based on contents of the metadata file, wherein the instruction instructs the connected home device to adjust a setting to synchronize the connected home device with a portion of the media that is being presented via the output device.

14. The device of claim 13, the operations further comprising:
extracting the media from the second signal; and
delivering the media to the output device.

15. The device of claim 13, wherein the metadata file comprises a tag that associates a value for the setting with a sequence of frames of the media.

16. The device of claim 13, wherein the metadata file comprises a tag that associates a value for the setting with a sequence of timecodes of the media.

17. The device of claim 13, wherein the instruction is sent to the connected home device before the setting is to be adjusted.

18. The device of claim 13, the operations further comprising:
recognizing the media upon launch of the media by the output device; and
wherein the metadata file is received from a remote server.

19. The device of claim 18, wherein the media is stored on a tangible medium.

20. The device of claim 18, wherein the media is stored locally on the device.

* * * * *